(12) United States Patent
Xu et al.

(10) Patent No.: US 12,483,107 B2
(45) Date of Patent: Nov. 25, 2025

(54) ULTRA-MICRO VOICE COIL MOTOR BASED ON MICRO-ELECTRO-MECHANICAL SYSTEM THREE-DIMENSIONAL COIL

(71) Applicant: Beihang University, Beijing (CN)

(72) Inventors: Tiantong Xu, Beijing (CN); Haiwang Li, Beijing (CN); Kaiyun Zhu, Beijing (CN); Zhi Tao, Beijing (CN); Kaibo Lei, Beijing (CN); Yanxin Zhai, Beijing (CN); Xiao Zhang, Beijing (CN); Yuying Wu, Beijing (CN); Wenbin Wang, Beijing (CN); Xiaoda Cao, Beijing (CN); Weidong Fang, Beijing (CN)

(73) Assignee: Beihang University, Beijing (CN)

( * ) Notice: Subject to any disclaimer, the term of this patent is extended or adjusted under 35 U.S.C. 154(b) by 762 days.

(21) Appl. No.: 17/860,018

(22) Filed: Jul. 7, 2022

(65) Prior Publication Data

US 2023/0022202 A1 Jan. 26, 2023

(30) Foreign Application Priority Data

Jul. 26, 2021 (CN) .......................... 202110846533.1

(51) Int. Cl.
*H02K 1/02* (2006.01)
*H02K 41/035* (2006.01)

(52) U.S. Cl.
CPC ........... *H02K 41/0356* (2013.01); *H02K 1/02* (2013.01)

(58) Field of Classification Search
CPC .. H02K 1/02; H02K 1/00; H02K 1/06; H02K 1/12; H02K 41/0356; H02K 41/00; H02K 41/02; H02K 41/03; H02K 41/031

(Continued)

(56) References Cited

U.S. PATENT DOCUMENTS 5,202,595 A * 4/1993 Sim ..................... H02K 41/0356
310/27

FOREIGN PATENT DOCUMENTS

CN 101630891 A 1/2010
CN 104849005 A 8/2015
(Continued)

OTHER PUBLICATIONS

Kuriyama Yoshihiko, Movable Coil Type Voice Coil Motor, Feb. 1, 2018, JP 2018019532 (English Machine Translation) (Year: 2018).*

(Continued)

*Primary Examiner* — Alexander A Singh
(74) *Attorney, Agent, or Firm* — Westbridge IP LLC

(57) ABSTRACT

Disclosed is an ultra-micro voice coil motor based on Micro-Electro-Mechanical System (MEMS) three-dimensional coil. The ultra-micro voice coil motor based on MEMS three-dimensional coil comprises a yoke, where an accommodating cavity is formed in the yoke, and a tongue is arranged in the accommodating cavity of the yoke; and two permanent magnets symmetrically arranged at a top and a bottom of the accommodating cavity; the three-dimensional coil is provided with an iron core slot, and the tongue of the yoke passes through the iron core slot to be in clearance fit with the three-dimensional coil; one end of the yoke is provided with a baffle, same poles of two magnets face each other, and a stator of the voice coil motor is the three-dimensional coil or the yoke and the permanent magnets.

8 Claims, 8 Drawing Sheets

(58) Field of Classification Search
USPC ............... 310/216.021, 12.01, 12.03, 12.16
See application file for complete search history.

(56) References Cited

FOREIGN PATENT DOCUMENTS

| CN | 208739000 U | | 4/2019 | |
| --- | --- | --- | --- | --- |
| CN | 109741903 A | | 5/2019 | |
| CN | 111130296 A | * | 5/2020 | ............... H02K 1/34 |
| CN | 211655966 U | | 10/2020 | |
| CN | 112072890 A | | 12/2020 | |
| CN | 112599321 A | | 4/2021 | |
| JP | 2018019532 A | * | 2/2018 | |
| WO | 2015178760 A1 | | 11/2015 | |

OTHER PUBLICATIONS

Xu et al., Electromagnetic Vibration Energy Collector, May 8, 2020, CN 111130296 (English Machine Translation) (Year: 2020).*
First Office Action issued in counterpart Chinese Patent Application No. 202110846533.1, dated Feb. 28, 2022.
Refusal Decision issued in counterpart Chinese Patent Application No. 202110846533.1, dated Oct. 9, 2022.
Second Office Action issued in counterpart Chinese Patent Application No. 202110846533.1, dated Jul. 11, 2022.
Sun et al., A MEMS Voice Coil Motor with a 3D Solenoid Coil, https://www.researchgate.net/publication/352578647, dated Apr. 30, 2021.
Sun et al., A MEMS Voice Coil Motor with a 3D Solenoid Coil, Proceedings of the 16th Annual IEEE International Conference on Nano/Micro Engineered and Molecular Systems, pp. 1745-1748, dated Apr. 29, 2021.
Supplementary Search Report issued in counterpart Chinese Patent Application No. 202110846533.1, dated Jul. 1, 2022.

* cited by examiner

ULTRA-MICRO VOICE COIL MOTOR BASED ON MICRO-ELECTRO-MECHANICAL SYSTEM THREE-DIMENSIONAL COIL

CROSS-REFERENCE TO RELATED APPLICATIONS

This application claims priority to Chinese Patent Application No. 202110846533.1, filed on Jul. 26, 2021, the contents of which are hereby incorporated by reference.

TECHNICAL FIELD

The application relates to the technical field of Micro-Electro-Mechanical System (MEMS), and in particular to an ultra-micro voice coil motor based on MEMS three-dimensional coil.

BACKGROUND

A voice coil motor is a kind of special linear drive motor, and an electrified wire is acted by force in a magnetic field. Because a structure and mechanism of the voice coil motor are similar to those of a speaker, it is called the voice coil motor.

The voice coil motor, performing linear reciprocating motion without a transmission mechanism, and having advantages of a simple structure, high response, simple control and miniaturization, etc., is widely used in precision positioning systems, such as optical lens, high-precision displacement platform, magnetic disk, laser record positioning, etc. In recent years, the potential of applying voice coil motors in driving systems, such as micro-aircrafts, micro-pumps, etc. has been continuously developed, and therefore higher requirements are put forward for parameters such as volume, stroke, stroke thrust and energy density of linear motors.

Micro-devices, such as micro-aircrafts, micro-pumps, micro-robots, have a growing demand for small sizes. Voice coil motors, as the power, also are desired to be of small sizes, light weight and high energy density. The conventional cylindrical voice coil motor has encountered great difficulties in miniaturization due to problems that the micro three-dimensional coil structure is difficult to mass produce, the whole machine structure is complicated, the radial magnetization of the micro cylindrical permanent magnet is difficult, and the cavity shape among the base, the iron core and the shell is difficult to machine.

In the prior art, Chinese invention patent with the application number of 200810012338.3 discloses a micro linear motor and its driving mode; and Chinese utility model patent with the application number of 202020069335.X discloses a voice coil motor which tries to miniaturize the voice coil motor, but there are many problems of the conventional cylindrical voice coil motor mentioned above.

SUMMARY

The objective of the present application is to provide an ultra-micro voice coil motor based on Micro-Electro-Mechanical System (MEMS) three-dimensional coil, which is simple to assemble, small in size, light in weight, high in thrust and energy density, capable of mass production, and fully capable of meeting the use requirements of power systems such as micro aircraft, micro pumps, micro robots, etc.

In order to achieve the above objectives, the present application provides the following technical scheme.

An ultra-micro voice coil motor based on MEMS three-dimensional coil, comprises:
a three-dimensional coil based on MEME,
a magnetic yoke, where the inside of the magnetic yoke is formed into an accommodating cavity, and a tongue is arranged in the accommodating cavity of the magnetic yoke; and
two permanent magnets, symmetrically arranged at a top and a bottom of the accommodating cavity.

The three-dimensional coil is provided with an iron core slot, and a tongue of the magnetic yoke passes through the iron core slot to be in clearance fit with the three-dimensional coil.

One end of the magnetic yoke is provided with a baffle.

Same poles of two magnets face each other, and a rotor of the voice coil motor is the three-dimensional coil or the magnetic yoke and the permanent magnets.

In an embodiment, the magnetic yoke is configured as an E-shaped magnetic yoke structure.

The magnetic yoke includes: an outer iron core having an upper jaw and a lower jaw; and the tongue formed inside the outer iron core.

One end of the magnetic yoke is formed into an open structure, and one end of the open structure of the magnetic yoke is provided with the baffle.

The magnetic yoke is E-shaped structure by adhering multiple layers of silicon steel sheets, and a lubricating coating is deposited on the magnetic yoke.

A layer of parylene is deposited in a vacuum gas phase of the magnetic yoke, and a deposited thickness is less than 10 micrometers (μm).

In an embodiment, the permanent magnet arranged at an upper part is placed on a side of the upper jaw facing the tongue, and the permanent magnet arranged at a lower part is placed on a side of the lower jaw facing the tongue.

A space between the upper jaw and the tongue is larger than a sum of a thicknesses of the permanent magnet and the three-dimensional coil.

A space between the lower jaw and the tongue is larger than a sum of a thicknesses of the permanent magnet and the three-dimensional coil.

In an embodiment, motion modes of the voice coil motor are configured as follows:
when the three-dimensional coil is a rotor, the magnetic yoke and the permanent magnets are stators, and the three-dimensional coil moves linearly along an extension track of the tongue; or
when the three-dimensional coil is a stator, the magnetic yoke and the permanent magnets are rotors, and the magnetic yoke and the permanent magnets move linearly along the extension track of the tongue.

In an embodiment, a slot height of the iron core slot of the three-dimensional coil is 0.9 mm, and a slot width of the iron core slot is 3.6 mm.

A thickness of the tongue is 0.7 mm, and a width of the tongue is 3.3 mm.

In an embodiment, a length of the upper jaw of the magnetic yoke is 4.0 mm, and a width of the upper jaw is 3.3 mm.

A length of the lower jaw of the magnetic yoke is 4.0 mm, and a width of the lower jaw is 3.3 mm.

A height of the space between the upper jaw and the tongue is 1.05 mm.

A height of the space between the lower jaw and the tongue is 1.05 mm.

In an embodiment, the permanent magnets are configured as quadrilateral sheet structures.

A length of the permanent magnets ranges from 2 mm to 5 mm.

A width of the permanent magnets ranges from 2 mm to 5 mm.

A thickness of the permanent magnets ranges from 0.4 mm-0.5 mm.

In an embodiment, the length of the permanent magnets is 3.3 mm, the width of the permanent magnets is 2.5 mm, and the thickness of the permanent magnets is 0.5 mm.

In an embodiment, the permanent magnets are NdFeB permanent magnets.

In the above technical scheme, the ultra-micro voice coil motor based on MEMS three-dimensional coil provided by the application has the following beneficial effects.

The micro solenoid coil which is inserted into the iron core of the voice coil motor manufactured by MEMS technology solves the problem that the coil in the voice coil motor is difficult to be miniaturized and mass-produced; the lubricating layer is deposited on the three-dimensional coil and the E-shaped magnetic yoke, and the magnetic yoke is clearance-matched with the three-dimensional coil, thus reducing the friction resistance.

The voice coil motor in the present application solves the problem that the annular permanent magnet is difficult to magnetize when the conventional cylindrical voice coil motor is miniaturized by arranging the permanent magnets with quadrilateral structure, and the permanent magnets are arranged opposite to the coil, so that the magnetic induction intensity is maximized, and the permanent magnet is fully utilized.

The E-shaped magnetic yoke of the voice coil motor of the application not only restrains magnetism leakage, but also acts as the shell for assembling permanent magnets, so the structure is simplified, and the assembly and the miniaturization is facilitated. Meanwhile, the magnetic yoke is adhered by multiple layers, thus reducing the eddy current loss. The three-dimensional coil is designed with large pins, which contributes to stable power connection in actual use.

The three-dimensional coil, the magnetic yoke and the permanent magnets of the voice coil motor are used as rotors, and the baffle at the end of the magnetic yoke is used as a magnetic isolation material, so that the permanent magnets are stably placed in the magnetic yoke by the repulsion of the same pole of the permanent magnets and the attraction of the permanent magnets and the magnetic yoke, and then fixed after the position is determined.

BRIEF DESCRIPTION OF THE DRAWINGS

In order to more clearly explain the embodiments of the present application or the technical solutions in the prior art, the following will briefly introduce the drawings needed in the embodiments. Obviously, the drawings in the following description are only some of the embodiments provided in the present application, and others can be obtained according to these drawings for those of ordinary skill in the art.

DETAILED DESCRIPTION OF THE EMBODIMENTS

Figure 1:
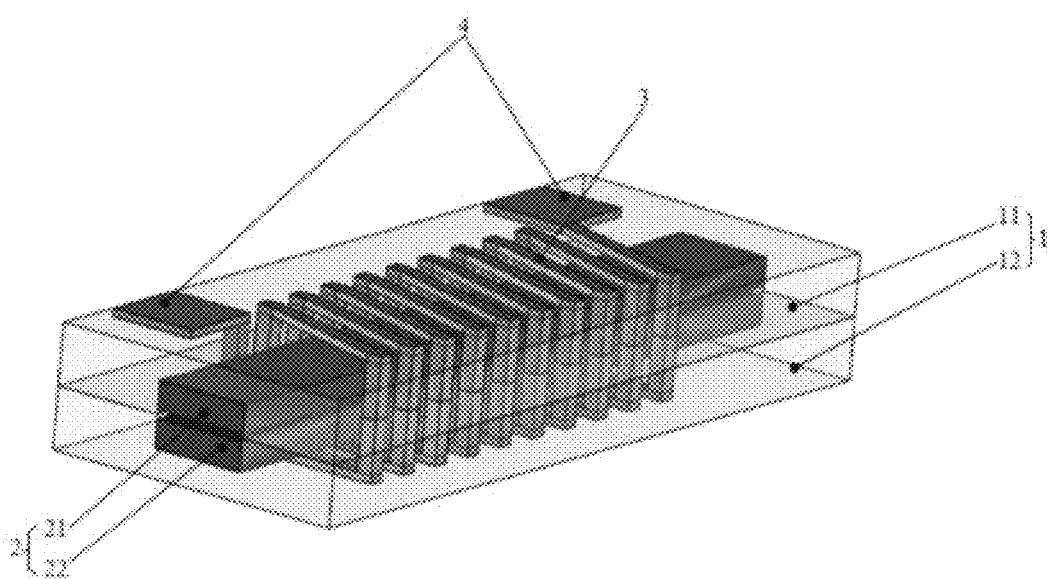
FIG. 1 is a schematic structural diagram of a three-dimensional coil based on MEMS technology adapted to a voice coil motor provided by an embodiment according to the present application.
Figure 2:
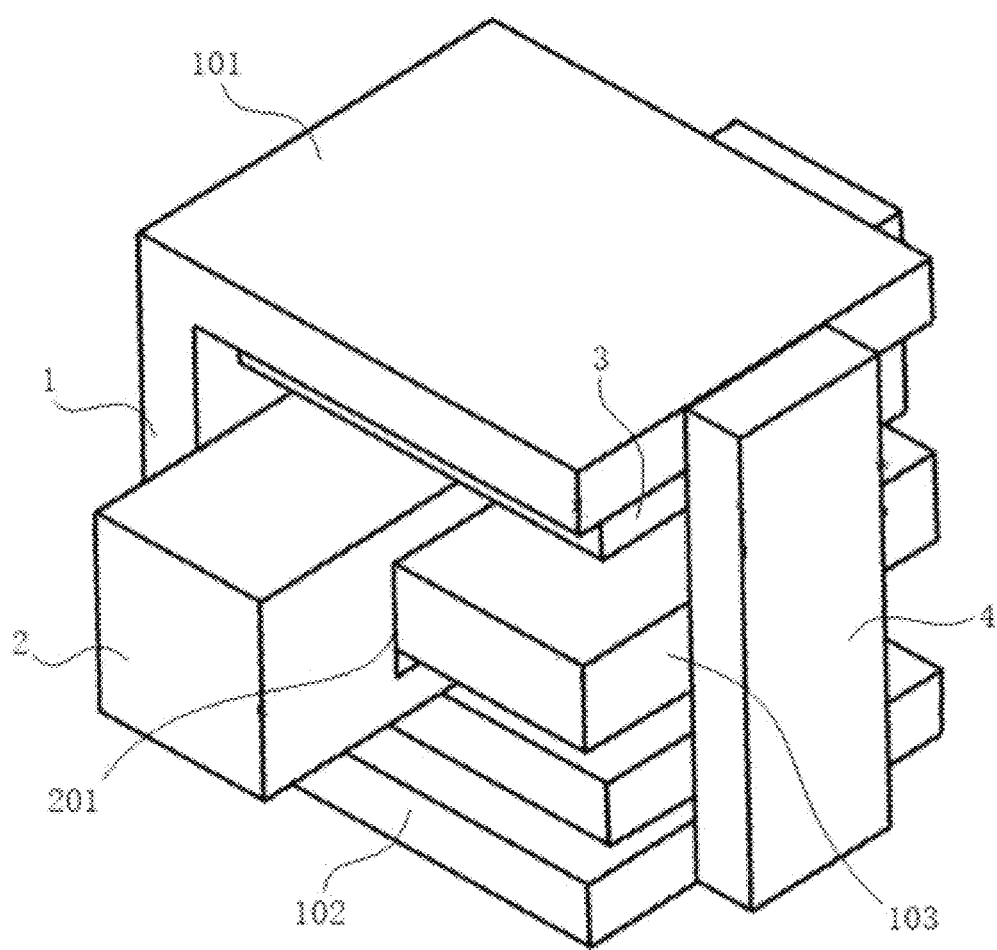
FIG. 2 is a structural schematic diagram of an ultra-micro voice coil motor based on MEMS three-dimensional coil provided by an embodiment according to the present application.
Figure 3:
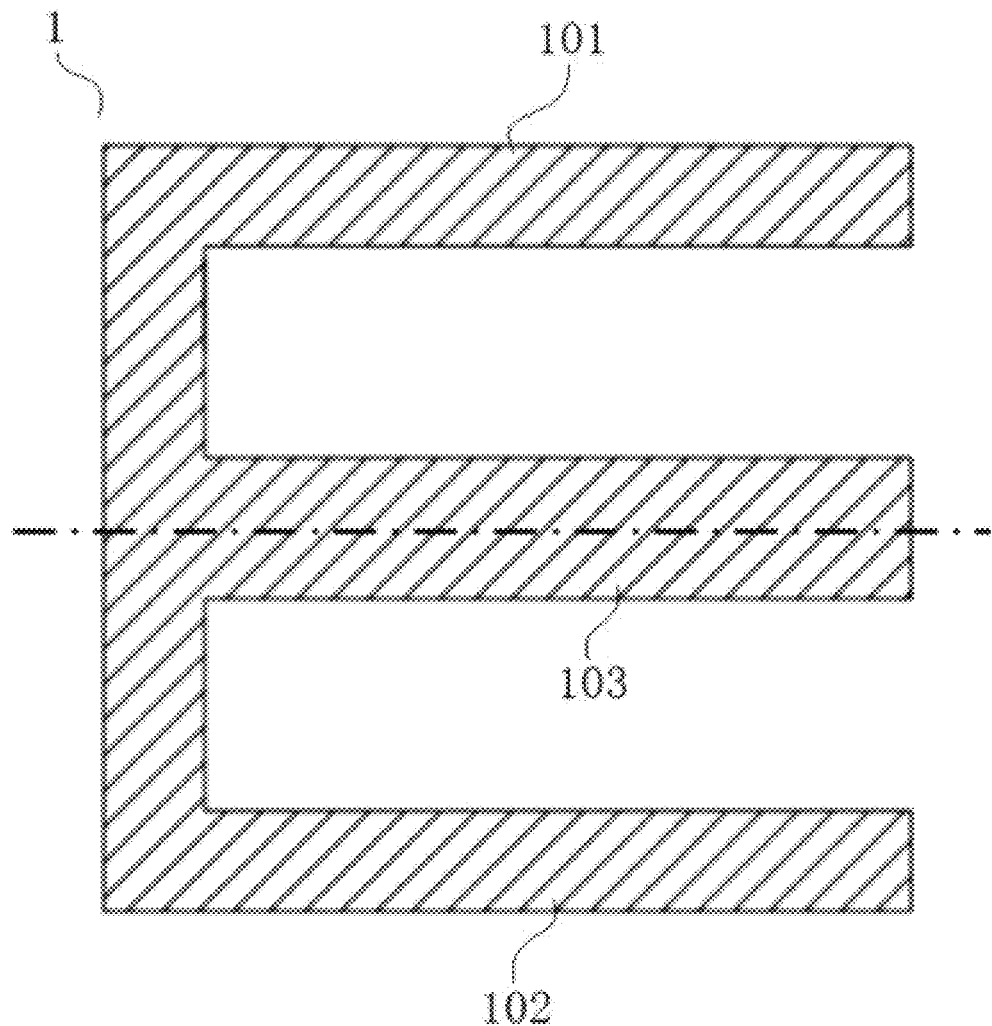
FIG. 3 is a front view of a magnetic yoke of an ultra-micro voice coil motor based on MEMS three-dimensional coil provided by an embodiment according to the present application.
Figure 4:
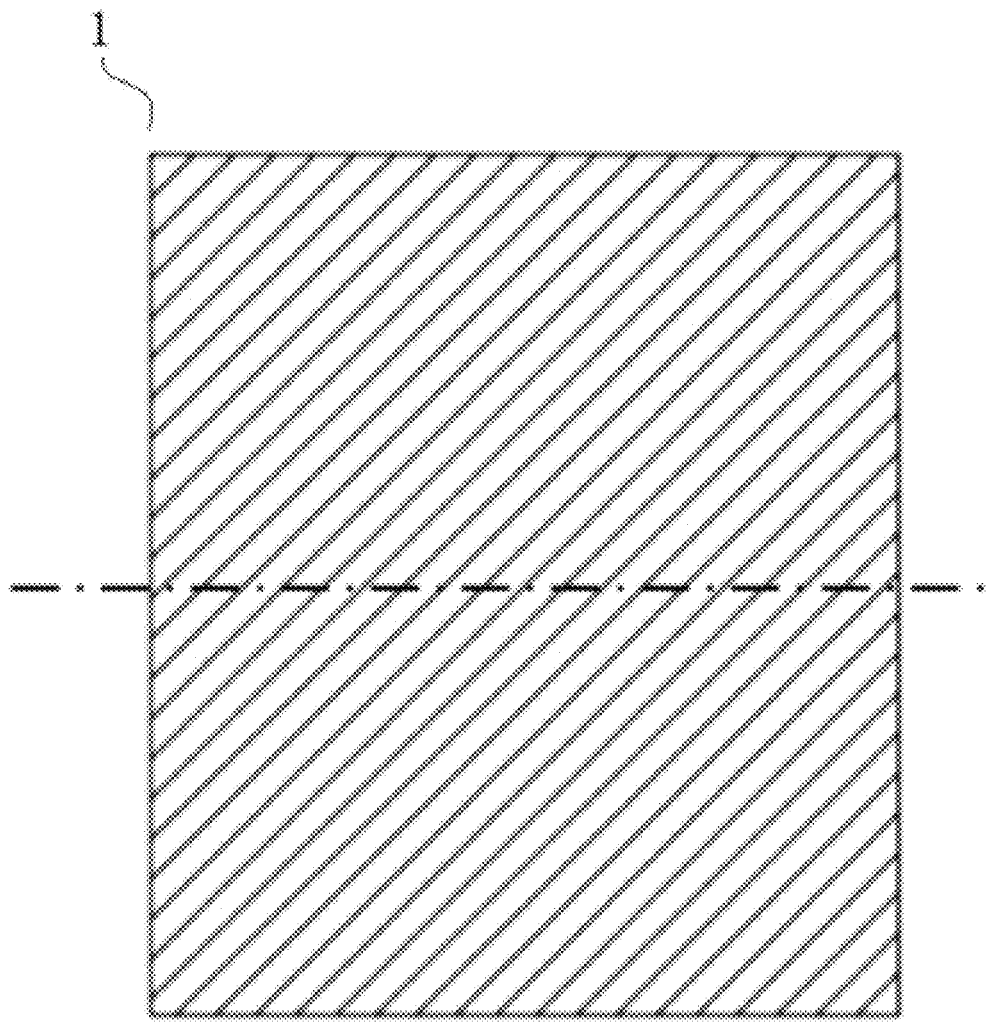
FIG. 4 is a side view of a magnetic yoke of an ultra-micro voice coil motor based on MEMS three-dimensional coil provided by an embodiment according to the present application.
Figure 5:
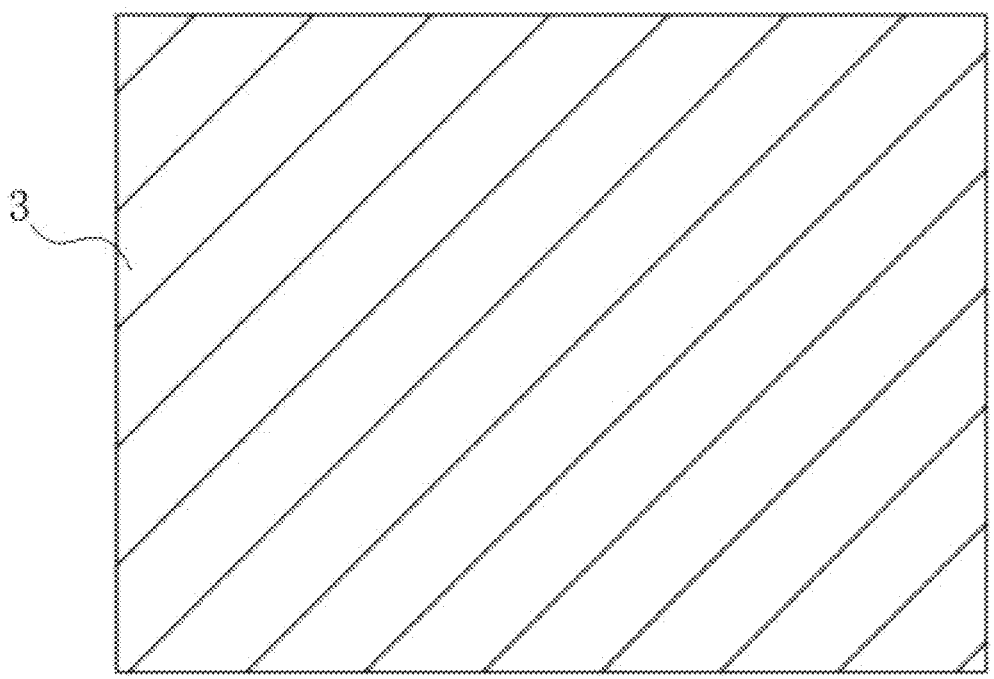
FIG. 5 is a front view of permanent magnets of an ultra-micro voice coil motor based on MEMS three-dimensional coil provided by an embodiment according to the present application.
Figure 6:
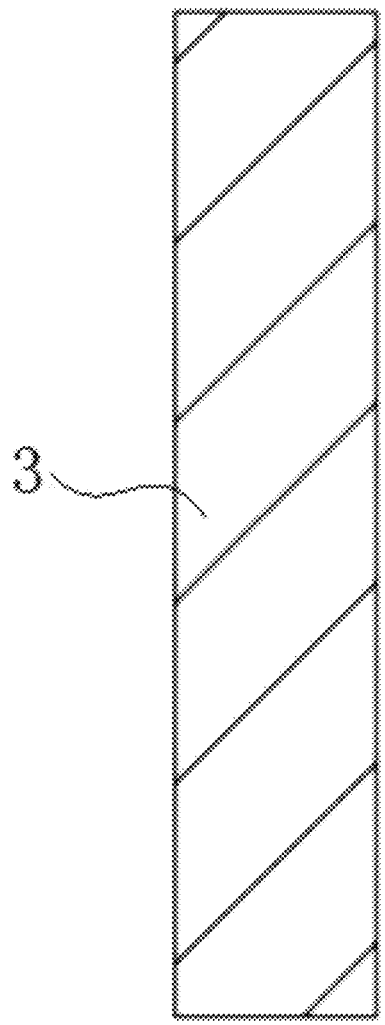
FIG. 6 is a side view of permanent magnets of an ultra-micro voice coil motor based on MEMS three-dimensional coil provided by an embodiment according to the present application.
Figure 7:
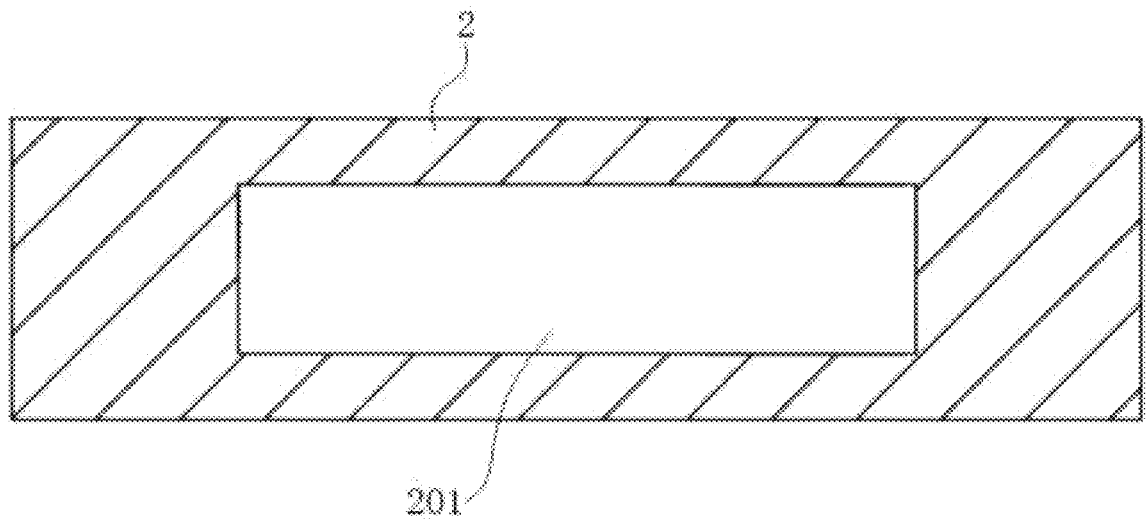
FIG. 7 is a front view of a three-dimensional coil of an ultra-micro voice coil motor based on MEMS three-dimensional coil provided by an embodiment according to the present application.
Figure 8:
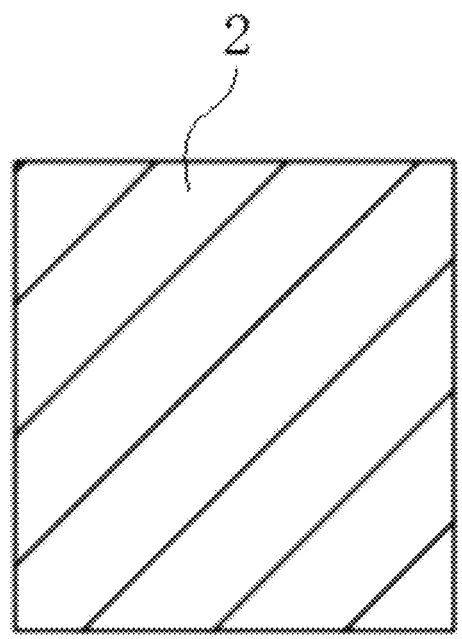
FIG. 8 is a side view of a three-dimensional coil of an ultra-micro voice coil motor based on MEMS three-dimensional coil provided by an embodiment according to the present application.

In order to enable those skilled in the art to better understand the technical scheme of the present application, the present application will be further described in detail with reference to the accompanying drawings.

As shown in FIG. 2 to FIG. 8, an ultra-micro voice coil motor based on MEMS three-dimensional coil comprises:
- a three-dimensional coil based on MEMS,
- a magnetic yoke 1, where the inside of the magnetic yoke 1 is formed as an accommodating cavity, and the accommodating cavity of the magnetic yoke 1 is provided with a tongue 103; and
- the two permanent magnets 3 symmetrically arranged at a top and a bottom of the accommodating cavity.

The three-dimensional coil 2 is provided with an iron core slot 201, and the tongue 103 of the magnetic yoke 1 passes through the iron core slot 201 for clearance fit with the three-dimensional coil 2.

One end of the magnetic yoke 1 is provided with a baffle 4.

Same poles of two magnets face each other, and a rotor of the voice coil motor is the three-dimensional coil 2, or the magnetic yoke 1 and the permanent magnets 3.

Specifically, the voice coil motor disclosed in this embodiment mainly includes a magnetic yoke 1, permanent magnets 3, and the three-dimensional coil 2. Firstly, the three-dimensional coil 2 is introduced. As shown in FIG. 1, the three-dimensional coil 2 in this embodiment is manufactured based on MEMS technology, and a center of the three-dimensional coil 2 is provided with the iron core slot 201 for passing through the tongue 103 of the magnetic yoke 1. The three-dimensional coil 2 does not contain an iron core structure, and the iron core slot 201 is communicated with the outside, allowing the magnetic yoke to be inserted, and realizing a relative linear motion between the three-dimensional coil 2 and the magnetic yoke 1. Therefore, a coil processing does not include a first step of ferrite core electroplating. At the same time, after the MEMS three-dimensional coil is processed, the lubricating coating is deposited around the core slot 201 to reduce a friction during linear motion. For example, a layer of parylene is deposited by vacuum gas phase with a thickness of less than 10 μm. In order to connect the coil with the power supply conveniently, there are larger pins on both sides of a horizontal slot. In order to cooperate with the three-dimensional coil 2 made based on MEMS technology, the magnetic yoke 1 and the permanent magnets 3 of this embodiment are designed to form a voice coil motor. The center of the magnetic yoke 1 of this embodiment has the tongue 103, the tongue 103 penetrates into the core slot 201 of the three-dimensional coil 2 and is in clearance fit. One permanent magnet 3 is designed at the upper and lower positions respectively, and same poles of two magnets 3 face each other, so that the permanent magnets 3 can be stably placed in the magnetic yoke 1 under the repulsion of the same pole between the permanent magnets 3 and the attraction between the permanent magnets 3 and the magnetic yoke 1. After the position of permanent magnets is determined, they are fixed by adhesive.

Optionally the magnetic yoke 1 of this embodiment is configured as an E-shaped magnetic yoke structure.

The magnetic yoke 1 includes: an outer iron core having an upper jaw 101 and a lower jaw 102; and the tongue 103 formed inside the outer iron core.

One end of the magnetic yoke 1 is formed into an open structure, and the baffle 4 is installed at one end of the open structure of the magnetic yoke 1.

The magnetic yoke 1 is E-shaped structure by adhering multiple layers of silicon steel sheets, and the magnetic yoke 1 is deposited with lubricating coating.

A layer of parylene is deposited in the vacuum gas phase of magnetic yoke 1, and a deposited thickness is less than 10 μm.

Among them, more specifically: the permanent magnet 3 arranged on the upper part is placed on a side of the upper jaw 101 facing the tongue 103, and the permanent magnet 3 arranged on lower part is placed on a side of the lower jaw 102 facing the tongue 103.

A space between the upper jaw 101 and the tongue 103 is larger than a sum of a thicknesses of the permanent magnet 3 and the three-dimensional coil 2.

A space between the lower jaw 102 and the tongue 103 is larger than a sum of a thicknesses of the permanent magnet 3 and the three-dimensional coil 2.

As for assembly, the tongue 103 of the E-shaped magnetic yoke 1 is inserted into the iron core slot 201 of the three-dimensional coil 2, and a clearance fit is made, ensuring a small friction force during the relative linear motion. Meanwhile, the size of an upper and lower spaces is correspondingly slightly larger than the sum of the thicknesses of the permanent magnet 3 and the three-dimensional coil 2, so that the linear motion is further ensured.

The motion of the voice coil motor is configured as follows:
   when the three-dimensional coil 2 is a rotor, the magnetic yoke 1 and the permanent magnets 3 are stators, and the three-dimensional coil 2 moves linearly along an extension track of the tongue 103; or
   when the three-dimensional coil 2 is a stator, the magnetic yoke 1 and the permanent magnets 3 are rotors, and the magnetic yoke 1 and the permanent magnets 3 move linearly along the extension track of the tongue 103.

In a preferred embodiment, a slot height of the core slot 201 of the three-dimensional coil 2 is 0.9 mm, and a slot width of the core slot 201 is 3.6 mm.

A thickness of the tongue 103 is 0.7 mm, and a width of the tongue 103 is 3.3 mm.

A length of the upper jaw 101 of the magnetic yoke 1 is 4.0 mm, and a width of the upper jaw 101 is 3.3 mm.

A length of the lower jaw 102 of the magnetic yoke 1 is 4.0 mm, and a width of the lower jaw 102 is 3.3 mm.

A height of the space between the upper jaw 101 and the tongue 103 is 1.05 mm.

A height of the space between the lower jaw 102 and the tongue 103 is 1.05 mm.

Among them, the permanent magnets 3 of this embodiment are configured as quadrilateral sheet structures.

A length of the permanent magnets 3 ranges from 2 mm to 5 mm;

A width of the permanent magnets 3 ranges from 2 mm to 5 mm;

A thickness of the permanent magnet 3 ranges from 0.4 mm-0.5 mm.

More optionally, the permanent magnets 3 have lengths of 3.3 mm, widths of 2.5 mm and thicknesses of 0.5 mm.

The permanent magnets 3 are NdFeB permanent magnets.

In the above technical scheme, the ultra-micro voice coil motor based on MEMS three-dimensional coil provided by the application has the following beneficial effects:

A micro solenoid coil which is inserted into the iron core of the voice coil motor manufactured by MEMS technology solves the problem that the coil in the voice coil motor is difficult to be miniaturized and mass-produced. The lubricating layer is deposited on the three-dimensional coil 2 and the E-shaped magnetic yoke, and the magnetic yoke 1 and the three-dimensional coil 2 are in clearance fit, thus reducing the friction resistance.

According to the voice coil motor of the application, the permanent magnets 3 with quadrilateral structures solves the problem that the annular permanent magnet is difficult to magnetize when the conventional cylindrical voice coil motor is miniaturized, and the permanent magnets 3 is arranged just opposite to the coil, so that the magnetic induction intensity is maximized, and the permanent magnets 3 are fully utilized.

The E-shaped magnetic yoke of the voice coil motor of the application not only restrains magnetism, but also serves as a shell for assembling the permanent magnets 3, so that the structure is simplified, the assembly and miniaturization are facilitated, and the magnetic yoke is adhered by multiple layers, so that the eddy current loss is reduced. The three-dimensional coil 2 is designed with large pins, which is conductive to stable power connection in actual use.

The three-dimensional coil 2, the magnetic yoke 1 and the permanent magnets 3 of the voice coil motor of the application are allowed to work as rotors, and the baffle 4 at the end of the magnetic yoke 1 is used as a magnetic isolation material, so that the permanent magnets 3 are stably placed in the magnetic yoke 1 by using the repulsion of the same pole of the permanent magnets 3 and the attraction between the permanent magnets 3 and the magnetic yoke 1, and then finalized after the position is determined.

Some exemplary embodiments of the present application have been described above only by way of illustration. Undoubtedly, those skilled in the art can modify the described embodiments in various ways without departing from the spirit and scope of the present application. Therefore, the above drawings and descriptions are illustrative in nature and should not be construed as limiting the scope of protection of the claims of the present application.

What is claimed is:

1. An ultra-micro voice coil motor based on Micro-Electro-Mechanical System (MEMS) three-dimensional coil, comprising:

a three-dimensional coil based on MEMS;
a magnetic yoke, wherein an inside of the magnetic yoke is formed as an accommodating cavity, and a tongue is arranged in the accommodating cavity of the magnetic yoke; and
two permanent magnets symmetrically arranged at a top and a bottom of the accommodating cavity,
wherein the three-dimensional coil is provided with an iron core slot and the tongue of the magnetic yoke passes through the iron core slot to be in clearance fit with the three-dimensional coil;
one end of the magnetic yoke is provided with a baffle; and
same poles of the two permanent magnets face each other, and a mover of the ultra-micro voice coil motor is the three-dimensional coil or the magnetic yoke and the permanent magnets;
wherein the magnetic yoke is configured as an E-shaped magnetic yoke structure;
the magnetic yoke comprises:
an outer iron core having an upper jaw and a lower jaw; and
the tongue formed inside the outer iron core,
wherein one end of the magnetic yoke is formed into an open structure, and the baffle is installed at one end of the open structure of the magnetic yoke;
the magnetic yoke is formed by adhering a plurality of layers of silicon steel sheets, and a lubricating coating is deposited on the magnetic yoke; and
the magnetic yoke is deposited with a layer of parylene in a vacuum gas phase, and a deposited thickness is less than 10 micrometers.

2. The ultra-micro voice coil motor according to claim 1, wherein one of the permanent magnets arranged at an upper part is placed on a side of the upper jaw facing the tongue, and another of the permanent magnets arranged at a lower part is placed on a side of the lower jaw facing the tongue;
a space between the upper jaw and the tongue is larger than a sum of a thicknesses of the one of the permanent magnets and the three-dimensional coil; and
a space between the lower jaw and the tongue is larger than a sum of a thicknesses of the other of the permanent magnets and the three-dimensional coil.

3. The ultra-micro voice coil motor according to claim 2, wherein motion modes of the voice coil motor are configured as follows:
when the three-dimensional coil is the mover, the magnetic yoke and the permanent magnets are stators, and the three-dimensional coil moves linearly along an extension track of the tongue; or
when the three-dimensional coil is a stator, the magnetic yoke and the permanent magnets are movers, and the magnetic yoke and the permanent magnets move linearly along the extension track of the tongue.

4. The ultra-micro voice coil motor according to claim 2, wherein a slot height of the iron core slot of the three-dimensional coil is 0.9 millimeters (mm), and a slot width of the iron core slot is 3.6 mm;
a thickness of the tongue is 0.7 mm, and a width of the tongue is 3.3 mm.

5. The ultra-micro voice coil motor according to claim 4, wherein a length of the upper jaw of the magnetic yoke is 4.0 mm and a width of the upper jaw is 3.3 mm;
a length of the lower jaw of the magnetic yoke is 4.0 mm, and a width of the lower jaw is 3.3 mm;
a height of the space between the upper jaw and the tongue is 1.05 mm; and
a height of the space between the lower jaw and the tongue is 1.05 mm.

6. The ultra-micro voice coil motor according to claim 5, wherein the permanent magnets are configured as quadrilateral sheet structures;
a length of the permanent magnets ranges from 2 mm to 5 mm;
a width of the permanent magnets ranges from 2 mm to 5 mm; and
a thickness of the permanent magnet ranges from 0.4 mm-0.5 mm.

7. The ultra-micro voice coil motor according to claim 6, wherein the permanent magnets have lengths of 3.3 mm, widths of 2.5 mm and thicknesses of 0.5 mm.

8. The ultra-micro voice coil motor according to claim 7, wherein the permanent magnets are NdFeB permanent magnets.

* * * * *